Patented Oct. 20, 1942

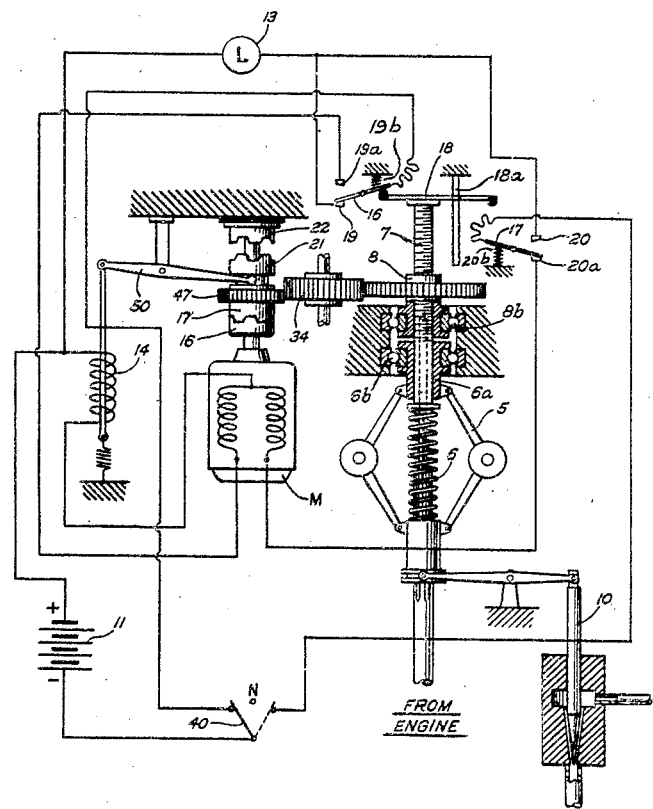

2,299,635

UNITED STATES PATENT OFFICE 2,299,635

PROPELLER CONTROL MECHANISM

Charles I. MacNeil, Glen Ridge, and Raymond T. Zwack, East Orange, N. J., assignors to Bendix Aviation Corporation, South Bend, Ind., a corporation of Delaware Application September 23, 1940, Serial No. 358,026

4 Claims. (Cl. 264—3)

This invention relates to propeller control mechanism and more particularly to a speed control mechanism.

This invention finds particular use as a control mechanism for controllable pitch propellers and especially as a means for maintaining constant speed of the propeller and its driving mechanism by variations in the pitch of the propeller.

In connection with the operation of airplanes, the desirability of having means by which the speed of the engine, especially an internal combustion engine, could be maintained constant has long been known. Among the advantages to be obtained from maintaining a constant engine speed might be mentioned the improvement in "take-off" characteristics.

There are, of course, many other conditions of flight in which the constant speed control mechanism is of particular advantage.

One of the objects of the present invention is to provide a practical propeller pitch control mechanism.

In Caldwell Patent No. 1,893,612 there is disclosed (see Fig. 7) a propeller pitch control mechanism involving a hydraulic unit whose control valve is open or closed to a degree sufficient to correct for any deviation of the engine from a speed pre-selected to be the normal, the shifting of the valve being brought about by the movement of a centrifugal governor and such movement being opposed by a spring tension (or compression, as the case may be) is variable, by manual manipulation of an adjusting thumb screw, for the purpose of changing from one pre-selected speed to another, if and when desired.

The present invention adds to the Caldwell system the concept of automatic governor adjustment—the Caldwell thumb screw being replaced by a power screw which exerts upon the governor spring (thus varying the hydraulic unit valve setting), a pressure proportionate to the degree of rotation of the actuating nut with which the power screw engages—this actuating nut being in turn driven by an electric motor which remains energized only so long as is necessary to establish the pre-selected speed setting of the governor, whereupon said motor is automatically de-energized. This concept of automatic governor adjustment envisages a speed control arrangement wherein the control of the hydraulic valve, above referred to, will be the sole factor governing the bringing of the engine to the desired predetermined speed; and wherein said control will be effected through the governor modifying power screw in such manner that a definite point of travel of the power screw corresponds to a definite engine speed; wherefore by de-energizing the electric driving motor when the engine reaches the desired predetermined speed the governor modifying power screw (and hence the governor modifier itself) will be set to maintain the desired predetermined engine speed.

Other objects and advantages of the invention will be apparent from the following description and from the accompanying drawing wherein the figure is a diagrammatic representation of one embodiment of the invention, partly in section and partly in elevation of the centrifugal governor and certain associated parts.

In the drawing, the above-described governor is shown at 5, the governor spring at 6, power screw at 7, the actuating nut at 8, the reversible electric motor at M, and the valve for governing the fluid feed to the Caldwell pitch regulating hydraulic unit at 10. The control circuits include battery 11 (representing any suitable current source), indicator 13, manual directional (field reversing) control switch 40, and a solenoid winding 14 controlling release of the normally engaged clutch element 21, 22 and simultaneous engagement of the normally disengaged clutch elements 16, 17, the latter of which is frictionally engaged by the novel brake elements shown best in Fig. 1 of Patent No. 2,180,287 granted to Raymond T. Zwack, one of the joint applicants herein, on November 14, 1939.

The flyball governor head attaches to and is driven by the engine at proportional speed; the operation of the hydraulically stabilized mechanism to change and control the propeller pitch is controlled by the position of the pilot valve plunger in the governor housing, which in turn, is governed by the compression of the spring. Therefore, to change the pitch of the propeller (to change the speed at which the engine is running) the compression of the spring must be changed by the pilot.

To adjust the spring loading for low pitch position, control switch 40 is operated in the proper direction and held. This closes the electrical circuit of the winding of one field of the reversible D. C. motor M, and the solenoid 14, holding the brake teeth on the movable tooth-clutch element 21 away from associated teeth 22 of the brake. With suitable variable resistance (not shown) inserted in the circuit (as, for example, across the motor armature) the number of seconds required for the spring loader to move all the way from the high to the low pitch position may be regulated as desired. When this pitch limit is reached, contacts 16, 19 (or 17, 20, as the case may be) operate to illuminate indicator 13, thereby signaling the operator to return switch 40 to position "N" (neutral). This swinging of the switch element from its normal position not only energizes indicator 13; it simultaneously breaks the motor circuit at the terminal point 19a (or 20a, as the case may be) thereby allowing the motor and solenoid to de-energize. This instantly causes the movable clutch assembly teeth 21 to engage with the band brake teeth 22, thus bringing the gear train and loader 7 to a sudden stop. It is to be understood that springs or equivalent will be provided, as indicated at 19b and 20b, to constantly urge the contact arms into engagement with contact terminals 19a and 20a, respectively, and that each of these arms is thereby caused to return to said normal position as soon as the screw-carried switch actuator 18 moves out of engagement therewith. It follows, from the foregoing, that not more than one of said switch arms can be in the open-circuit position, with respect to motor M, at any given time.

To adjust for extreme high pitch position, the operation is the same as above, but in the reverse direction. The spring loading may be stopped at any intermediate position between the limiting ones described above by simply returning the switch 40 to position "N" at the desired intermediate pitch. This allows the clutch-brake to act and stop the loader 7 within approximately .0002 inch from the point occupied when the switch was released. The proper time for release is determined by the engine speed, as indicated on the tachometer. For synchronization, switch 40 may be successively pressed in the proper direction ("inched")—the change in R. P. M. for each "inching" operation being on the order of one or two R. P. M. change. This extreme degree of sensitivity is made possible, as above indicated, by reason of the rapidity of the braking action; yet this rapidity of the braking action has no deleterious effect upon the armature of the driving motor, due to the simultaneous disconnection of the drive at 16, 17, which leaves the motor free to decelerate at a normal pace, with its shaft extension 36 running idly within the journaling means constituted by the clutch-brake elements 21 and 22.

In further explanation of the spring loading screw 7 and associated parts, it may be helpful to point out that the axial travel of the screw produces deflection of spring 6, but produces no corresponding axial movement of governor head 6a, the latter being axially fixed within bearing 6b, and the said bearing constituting part of the means for holding said governor head against axial movement, and at the same time supporting the governor mechanism as a whole. Bearing 6b, along with bearing 8b—the latter being part of the supporting means for nut 8—are mounted in recesses in the supporting housing, as shown. Conversely, rotation of governor head 6a (with the governor weights) produces no effect upon screw 7, as the smooth-bored governor head runs freely on the helical surfaces of the screw, in such manner that each is movable relatively of the other.

Switch actuator 18 may be provided with an aperture adapted to receive a fixed rod 18a to act as a guide and thereby positively restrain the screw against any movement angularly, while permitting unrestricted linear movement in response to rotation of nut 8.

This application is a continuation, in part, of copending application Serial No. 173,052 filed November 5, 1937, since matured as Patent No. 2,218,760.

What is claimed is:

1. Governor regulating means for an engine speed controlling governor comprising, in combination, means including an electric motor and transmission for varying the governor adjustment to return the engine to a preselected speed, motion-stopping means including a combined clutch and brake applicable to stop rotation of the transmission concurrently with severance of the drive between the motor and transmission, means for energizing said motor, and means for automatically de-energizing said motor and shifting said combined clutch and brake after a predetermined degree of rotation thereof.

2. Governor regulating means for an engine speed controlling governor comprising, in combination, means including an electric motor-driven screw for varying the governor adjustment to return the engine to a preselected speed, motion stopping means including a combined clutch and brake applicable to stop screw travel concurrently with severance of the drive between the motor and screw, means for energizing said motor-driven screw, and means for automatically de-energizing said motor-driven screw and applying said brake after a predetermined degree of travel thereof.

3. In a governor regulator, a source of power, a screw-shaft driven from said source of power, a combined clutch and brake element interposed between said source and said screw-shaft, and means for automatically shifting said combined clutch and brake element to stop said screw-shaft concurrently with severance of the drive thereto from said source of power, and after a predetermined degree of movement of said screw-shaft.

4. In a governor regulator, a source of power, a gear-train driven from said source of power, a combined clutch and brake element interposed between said source and said gear-train, and means for automatically shifting said combined clutch and brake element to stop said gear-train concurrently with severance of the drive thereto from said source of power, and after a predetermined degree of movement of said gear-train.

CHARLES I. MacNEIL.
RAYMOND T. ZWACK.